(12) United States Patent  
Männer

(10) Patent No.: US 7,311,136 B2  
(45) Date of Patent: Dec. 25, 2007

(54) INJECTION MOLD WITH ELECTRONIC COUNTER

(75) Inventor: Hans-Peter Männer, Bahlingen (DE)

(73) Assignee: Otto Männer Innovation GmbH, Bahlingen (DE)

( * ) Notice: Subject to any disclaimer, the term of this patent is extended or adjusted under 35 U.S.C. 154(b) by 0 days.

(21) Appl. No.: 11/507,005

(22) Filed: Aug. 18, 2006

(65) Prior Publication Data
US 2007/0054004 A1  Mar. 8, 2007

(30) Foreign Application Priority Data
Sep. 8, 2005 (DE) ................ 20 2005 014 156 U

(51) Int. Cl.
*B22D 17/08* (2006.01)
(52) U.S. Cl. .......... 164/312; 164/113; 164/154.1; 425/135
(58) Field of Classification Search ........... 164/312, 164/113, 154.1; 425/135
See application file for complete search history.

(56) References Cited

U.S. PATENT DOCUMENTS 6,377,649 B1 * 4/2002 Stuart .................... 377/15
7,128,548 B2 * 10/2006 Manner ................ 425/135
2004/0121034 A1 * 6/2004 McBain ................. 425/96

FOREIGN PATENT DOCUMENTS

EP  1 486 312  12/2004

* cited by examiner

*Primary Examiner*—Kevin Kerns
*Assistant Examiner*—I.-H. Lin
(74) *Attorney, Agent, or Firm*—Klaus J. Bach

(57) ABSTRACT

In an injection mold including at least two mold sections which are movable relative to one another for opening and closing the injection mold and an electronic counter with an actuator and a sensor element supplying, influenced by the actuator, a signal indicative of the number of closings of the injection mold, the sensor element is disposed in a first housing and the electronic counter is disposed outside the first housing and connected to the sensor element via an electrical communication line.

3 Claims, 1 Drawing Sheet

INJECTION MOLD WITH ELECTRONIC COUNTER

BACKGROUND OF THE INVENTION

The invention relates to an injection mold including at least two mold sections which are movable relative to one another for opening and closing the mold and a counting device including an electronic counter for counting the mold closing procedures by means of an actuator, and a first sensor element recording the number of closing procedures as a result of a signal generated by the actuator.

Such an injection mold is known for example from DE 203 08 880.8 U1.

Although the known injection mold has been operating reliably, it has the disadvantage that its counting device is quite large. The counting device therefore projects from the respective mold section so that it is easily struck and possibly damaged thereby. Furthermore, the relatively large counting device requires a corresponding space and cannot be accommodated in the space normally provided for example for the installation of a mechanical counter.

It is the object of the present invention to provide an injection mold of the type described above wherein the counting device will not project, or project only little, from the mold section in which it is accommodated.

SUMMARY OF THE INVENTION

In an injection mold including at least two mold sections which are movable relative to one another for opening and closing the injection mold and an electronic counter with an actuator and a sensor element supplying, influenced by the actuator, a signal indicative of the number of closings of the injection mold, the sensor element is disposed in a first housing and the electronic counter is disposed outside the first housing and connected to the sensor element via an electrical communication line.

Since the sensor element is arranged in a first housing and the counter is arranged outside the first housing, the first housing can be very small and can well be accommodated in a cavity of one of the mold sections. As a result, if at all, it projects only very little from the respective mold section recess in which it is accommodated. The chance of being damaged is therefore very small.

The first housing may particularly be provided in the form of a mechanical counter arranged for example in the recess of the respective mold section so that the mechanical counter can easily be replaced by a counter according to the invention. This is very advantageous since injection molds designed for accommodating mechanical counters can easily be converted for using counters according to the invention.

An embodiment of the invention, wherein the actuator is arranged on the first housing has been found to be particularly advantageous. In this way, the construction shape of the counter is much simplified. There is only one element which includes the actuator and the first sensor element. This simplifies the mounting of the counter, or respectively, a possibly needed replacement of the counter device since only one element needs to be arranged at a particular mold section.

In a further particular embodiment of the invention, an additional sensor element is arranged in the first housing and is connected via an electric conduit to an evaluation unit, which is arranged outside the housing. In this way, in a simple manner, other parameters of the injection mold such as temperature and pressure can be recorded.

Since the additional sensor element is separated from the evaluation unit, it can be very small so that it can easily be accommodated in the first housing.

The additional sensor element can be connected to the evaluation unit under certain circumstances via the same electrical conduit by way of which the sensor element is connected to the electric counter. If the electric conduits are in the form of wire connections, the respective wires can be arranged in parallel and disposed in a common jacket. But other electric conductors known in the field of data transmission may be used. The electric communication may be established for example by radio transmission or a so-called bus connection may be provided.

In a very advantageous embodiment of the invention, a supervisory element is present, by which the duration of a disconnection between the first sensor element and the counter and/or the duration of disconnection between the additional sensor element and the evaluation unit can be determined. In this way, for example, any interruption of the connection between the counter and the sensor element will be noticed thereby avoiding that closing procedures of the injection mold occurring during such a phase are not recorded.

Below embodiments of the invention will be described in greater detail on the basis of the accompanying drawings.

DESCRIPTION OF PARTICULAR EMBODIMENTS

Figure 1:
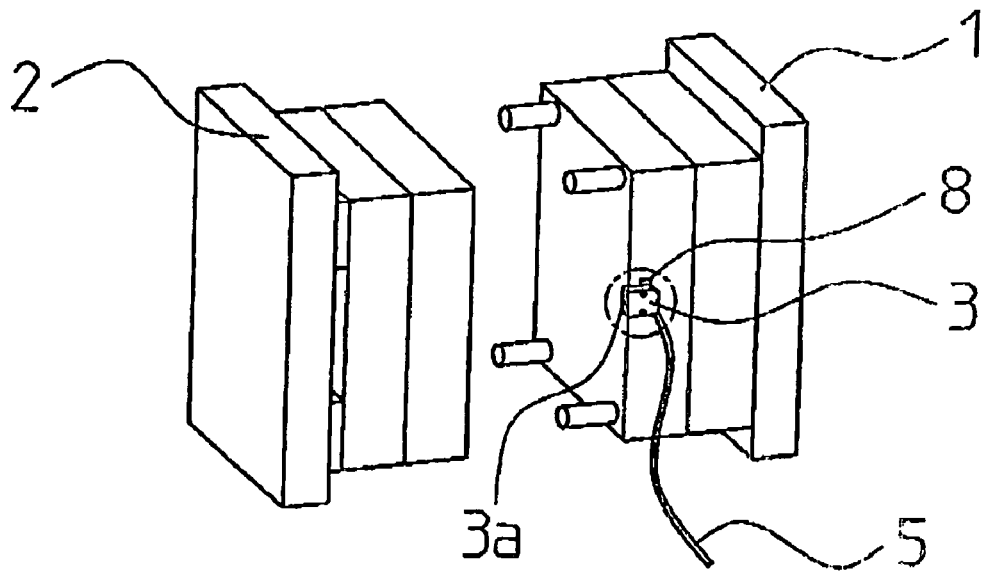
FIG. 1 shows schematically an injection mold including two mold halves in an open position with a first housing arranged in a cavity and enclosing a sensor element and an actuator.

As shown in FIG. 1, an injection mold consists essentially of a first mold half 1 and a second mold half 2. The first mold half 1 is movable relative to the second mold half 2. The mold plates including the negative shapes or mold nests are not shown in FIG. 1 for clarity reasons.

The first mold half 1 is provided with a cavity in which a first housing 3 is arranged that is provided with an axially movable pin-like actuator 3a.

Figures 2, 3:
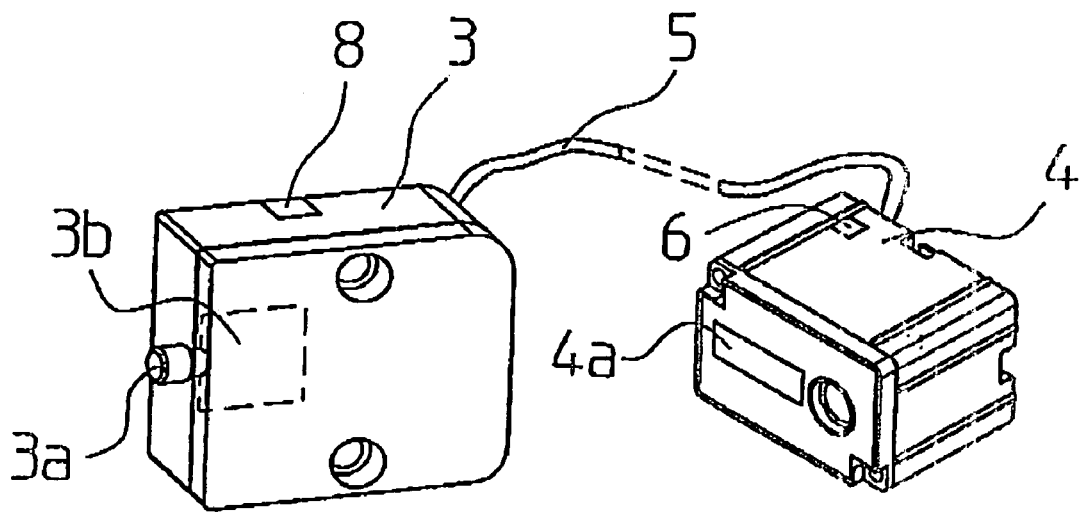
FIG. 2 shows the first housing of FIG. 1 in an enlarged representation.
FIG. 3 shows a second housing, in an enlarged representation, which includes an electronic counter and an evaluation unit.

As shown particularly in FIG. 2, a sensor element 3b in the form of a piezo element is so arranged in the housing 3 that the actuator 3a applies a force to the first sensor element 3b upon axial movement into the housing 3. As a result, the first sensor element 3b emits a signal.

The signal provided by the first sensor element is supplied via an electrical conduit 5 in the form of a wire connection to an electronic counter 4a arranged in the second housing 4. The second housing 4 is shown in FIG. 3. It is preferably arranged at the operating panel for the respective injection molding machine.

Furthermore, the first housing 3 includes a disassembly sensor 8 by which it can be determined whether and, respectively, when and how long the first housing 3 was not disposed in the cavity of the first mold half 1. The signal supplied by the disassembly sensor 8 is conducted, by way of the conduit 5, to an evaluation unit disposed in the second housing 4. Then it is evaluated in a known manner and is further processed.

The second housing 4 includes a monitoring element 6, by which the connection of the first sensor element 3b with the electronic counter 4a is monitored. In this way, it can be determined whether or, respectively, when and how long the connection between the first housing 3 and the second housing 4 was interrupted.

The dimensions of the first housing 3 correspond to the dimensions of a mechanical counter as it has been used so far in connection with injection molds. The mechanical counter can therefore easily be replaced by the first housing 3.

What is claimed is:

1. An injection mold including at least two mold sections (1, 2) which are movable relative to one another for opening and closing the injection mold, and a counter arrangement including an electronic counter (4a) with an actuator (3a) and a sensor element (3b) supplying under the influence of the actuator (3a) a signal indicative of the number of closing procedures of the injection mold, said sensor element (3b) being disposed in a first housing (3) and the electronic counter (4a) being disposed outside the first housing (3) and connected to the sensor element (3b) via an electrical communication line (5) and a monitoring element (6) for determining an interruption of the connection between the sensor element (3b) and the counter (4a).

2. An injection mold according to claim 1, wherein the actuator (3a) is arranged at the first housing (3).

3. An injection mold according to claim 1, wherein the first housing (3) includes a disassembly sensor (8) for sensing a removal of the first housing (3) from the injection mold.

* * * * *